July 31, 1962    O. G. LANDSVERK ETAL    3,047,748
FRICTION CHARGERS
Filed March 30, 1959
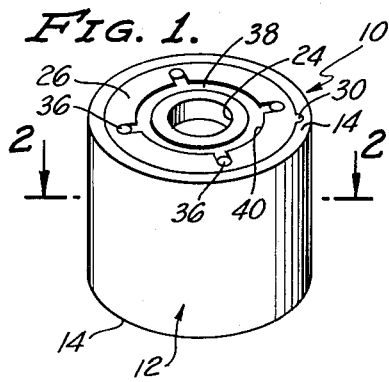
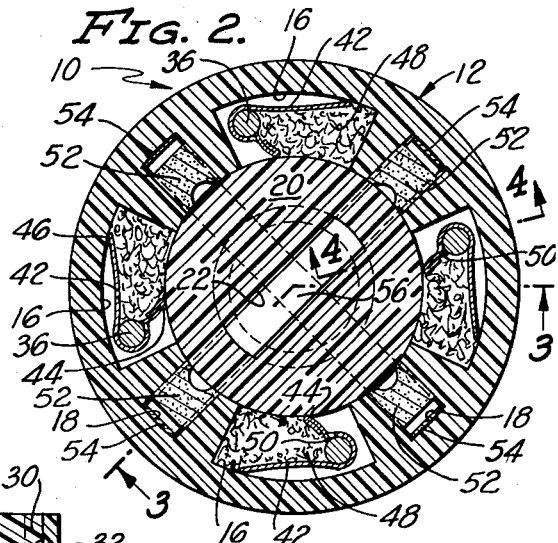
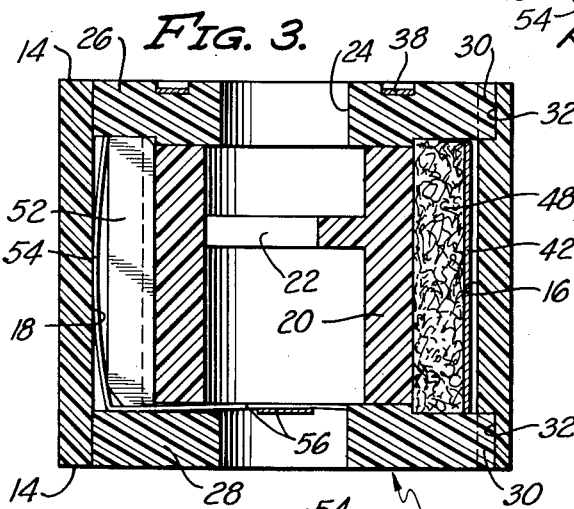
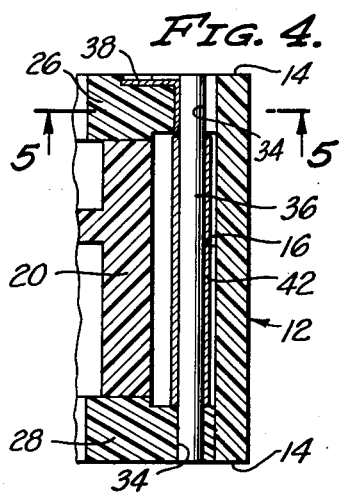
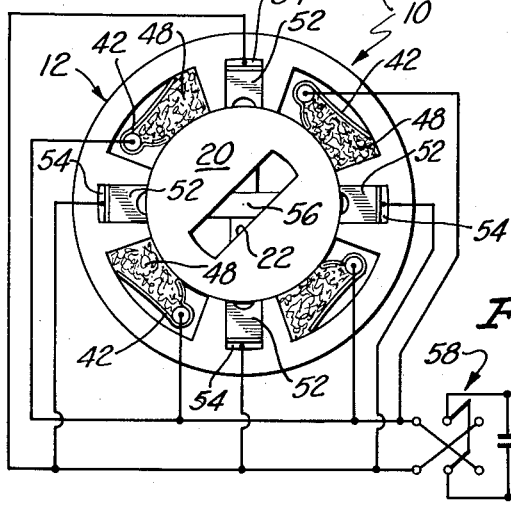
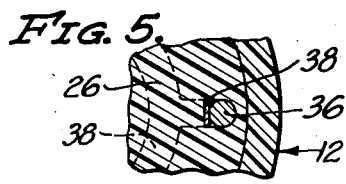
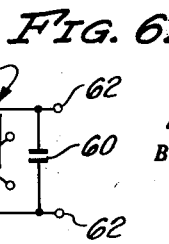
INVENTORS
OLE G. LANDSVERK
ZENONAS GLODENIS
DELBERT L. MERRINER
BY
ATTORNEY

United States Patent Office 3,047,748
Patented July 31, 1962

3,047,748
FRICTION CHARGERS
Ole G. Landsverk, Glendale, Zenonas Glodenis, Los Angeles, and Delbert L. Merriner, Glendale, Calif., assignors to Landsverk Electrometer Company, Glendale, Calif., a corporation of California
Filed Mar. 30, 1959, Ser. No. 803,029
14 Claims. (Cl. 310—7)

This invention relates to new and improved friction chargers.

The production of electrical charges by friction is commonly demonstrated in elementary physics classes by rubbing an inert, hard rubber rod with any one of a variety of materials such as fur, silk or the like. These demonstrations clearly establish that an electrical charge is produced whenever two dissimilar materials are rubbed together. They also establish that such a charge depends upon a number of factors. One of these is, of course, the specific materials used in producing a charge. A related factor is the degree to which such materials will pick up ambient moisture from the air. Since the production of an electrical charge by friction is to a large extent related to the hydroscopic character of the materials used in producing such a charge it is common to demonstrate the production of friction charges using materials such as hard rubber which are comparatively non-hydroscopic in character.

Almost as soon as various synthetic materials, such as various types of nylons, various vinyl polymers including halogenated vinyl polymers, and the like were developed and used, it was discovered that such materials were particularly effective in producing friction charges. In many cases this was demonstrated by the tendency of such materials to stick to other materials as when an article of clothing was rubbed against another article of clothing of a different material. The tendency of these synthetic material to develop friction charges frequently was very disadvantageous in manufacturing operations. Frequently it manifested itself by articles of these materials sticking to hard rubber rollers or other processing equipment.

Electrical charges produced by friction have been frequently used advantageously for a number of different tasks. Friction chargers including a rotor of one material, a friction pad of another material engaging this rotor and a metallic brush engaging the rotor have frequently been used in the past to charge various types of electrical instruments such as for example, dosimeters used in measuring various types of radiation. Friction chargers of this general type have been more or less satisfactory for the purposes intended, but have suffered from a number of inherent disadvantages and limitations.

Many of the prior instruments of this type have been incapable of being operated at a satisfactorily high charging rate. In many case s the friction charge obtained from them has been erratic or irregular and frequently such a charge has been incapable of being controlled satisfactorily. Many of the prior instruments of the type indicated in the preceding have been subject to loss of function when subjected to severe vibration or shock. Frequently such instruments have been incapable of being operated satisfactorily for a prolonged period. In many cases such prior instruments have been objectionable because of size, weight and shape. They also have been objectionable for other reasons.

A broad object of the present invention is to provide friction chargers which overcome many of the aforegoing and other limitations of prior friction chargers utilizing a rotor contacted by a material capable of generating a friction charge on such a rotor. An object of this invention is also to provide relatively simple and relatively inexpensive friction chargers which are not objectionable because of physical size, weight or shape considerations. An important object of this invention is to provide friction chargers which are capable of performing satisfactorily when operated over very prolonged periods.

Another object of this invention is to provide friction chargers which are very advantageous because of their performance characteristics. More specifically an object of the present invention is to provide friction chargers which can be used so as to provide a "smooth" or regular charge. A further object of this invention is to provide friction chargers which can be used so as to charge dosimeters of different ranges having widely varying capacities or similar instruments at roughly the same rate. Another object of this invention is to provide reversable friction chargers. An object of this invention is also to provide friction chargers which can be used to charge an instrument such as a dosimeter rapidly and which can then be used to change the charge on such an instrument at a relatively slow rate so as to charge it to an exact value if necessary.

These and other objects of this invention will be fully apparent to those skilled in the art to which the invention pertains from a detailed consideration of the remainder of this description including the appended claims and the accompanying drawing in which:

FIG. 1 is an isometric view of a friction charger of this invention;

FIG. 2 is a cross-sectional view taken at line 2—2 of FIG. 1;

FIG. 3 is a cross-sectional view taken at line 3—3 of FIG. 2;

FIG. 4 is a cross-sectional view taken at line 4—4 of FIG. 2;

FIG. 5 is a cross-sectional view taken at line 5—5 of FIG. 2; and

FIG. 6 is a schematic view illustrating the use and connection of a friction charger of this invention.

The accompanying drawing is primarily intended so as to clearly illustrate a presently preferred embodiment or form of this invention. Those skilled in the art to which this invention pertains will realize however that a number of differently constructed and appearing friction chargers may be designed using the essential features or principles of this invention as hereinafter explained through an exercise of routine engineering skill.

As an aid to understanding this invention it can be stated in essentially summary form that it concerns friction chargers, each of which includes a rotor having a surface of a non-conductive material. With a friction charger of this invention bodies of second and third materials, each differing from the material on the surface of the rotor are held against the surface of the rotor. Conductor means are also used in conveying charges from the surface of the rotor as it is rotated in contact with these bodies of material. As hereinafter indicated such bodies are employed in pairs within a friction charger of this invention, and a number of such pairs may be used together with appropriate conductor means in conjunction with a single rotor.

The actual nature of this invention is best explained by referring directly to the accompanying drawing. Here there is shown a friction charger 10 of this invention which includes a cylindrical housing 12 having ends 14; these ends 14 are connected by internal slots 16 and 18. As can be seen in FIGS. 2 and 6 of the drawing a plurality of pairs of these slots are used. The slots 16 and 18 are spaced from one another so as to separate portions of the interior of the housing 12 which serve to rotatably support a cylindrical rotor 20. This rotor 20 preferably includes a center slot 22 which is adapted to be engaged by a screw driver or other similar instrument (not shown) used in rotating this rotor.

An opening 24 is provided in an end cap 26 closing one of the ends 14 of the housing for the purpose of allowing such an instrument to be inserted into the slot 22 so that the rotor 20 may be rotated. The other end 14 of the housing is preferably closed by means of a similar end cap 28. It is presently preferred to hold these end caps 26 and 28 in place by means of small bumps 30 on them which are designed to fit within correspondingly shaped internal depressions 32 formed in the housing 12.

Preferably the housing 12, the rotor 20, and the end caps 26 and 28 are all formed out of highly nonconductive or insulating materials such as common types of nylon, polystyrene or the like. When the housing 10 and the end caps 26 and 28 are formed out of such materials the bumps 30 can be snapped into place within the depressions 32 with a minimum of difficulty. Obviously, however, the caps 26 and 28 may be secured in position by other equivalent means.

The end caps 26 and 28 are provided with holes 34 which are aligned with one another and with the slots 16. These holes 34 carry metal rods 36 which are electrically connected together by means of a metal ring 38 located within a groove 40 in the end cap 26. This ring 38 may be secured to the rods 36 in any convenient manner such as by soldering, welding or the like.

Each of the rods 36 is positioned against the base of a generally U-shaped metal brush 42 having ends 44 and 46. The ends 44 of the brush 42 resiliently bear against the surface of the rotor 20. The ends 46 of the brush 42 resiliently bear against bodies 48 so as to resiliently hold these bodies 48 against the surface of the rotor 20. As is best seen in FIG. 2 of the drawing small bent tips 50 on the brushes 42 may be used in order to insure that the brushes 42 are in electrical contact with the rods 36 at all times. These tips 50 are formed so as to tend to "dig in" to the surfaces of the rods 36.

Within the slots 18 other bodies 52 are held against the periphery of the rotor 20 by means of small leaf springs 54 located at the bottoms of the slots 18. It is noted that the portions of the bodies 52 contacting the rotor 20 are curved to the shape of this rotor. The bodies 52 preferably have a U-shape with the legs of the U contacting the rotor 20 as shown. This construction is preferred since it tends to prevent extraneous material from depositing on all of the portions of the bodies 52 in direct contact with the rotor 20 after the instrument 10 has been used many times. These leaf springs 54 are connected together adjacent to the end caps 28 by means of attached metal cross bars 56. In FIG. 6 of the drawing it will be seen that the cross bars 56 and the ring 38 are, within a complete friction charger of this invention, connected to a reversing switch 58 from which there extend terminals used in connecting this device into an appropriate electrical circuit.

The bodies 48 and 52 in the charger 10 are of different materials and these materials are each different from the material used in the rotor 20. This construction permits an electric charge to be developed by each of the bodies 48 and 52 as the rotor 20 is turned. In order to achieve optimum results with a charger, such as the charger 10 is is preferred to form the bodies 48 out of a highly non-conductive material such as packed strands of inert non-conductive fibers such as, for example, polytetrafluoroethylene and polytrifluorochloroethylene or the like, although other materials can, of course, be used. The bodies 48 are in direct contact with the surface of the rotor 20 and with the brushes 42. It is considered necessary with the present invention that these bodies 48 directly contact the brushes 42 near the points where these brushes engage the surface of the rotor 20 in order to provide for efficient operation of the complete charger 10.

The bodies 52 may be formed out of virtually any material which is capable of conducting electrical charge to some extent and which is capable of producing an electrical charge when contacted by the rotor 20. It is preferred to form the bodies 52 out of various filled thermosetting resins such as various filled phenolic resins, known filled ureaformaldehyde resins or the like, although other materials may, of course, be employed. If the material used for the bodies 52 is not sufficiently conductive to convey charges from the surface of the rotor 20 to the springs 54 in electrical contact with these bodies the surfaces of the bodies 52 not in contact with the rotor 20 may be coated with a conductive material serving to facilitate conveying charges from the surface of the rotor 20 to the springs 54. Thus, with the present invention the bodies 52 are coated with a thin layer of graphite (not separately numbered), which coatings are worn off of the surfaces of the bodies 52 in contact with the rotor 20 through the use of an appropriate abrading instrument prior to assembly of the charger 10.

When the charger 10 is constructed so that the rotor 20 is formed out of nylon or the equivalent, so that the bodies 48 are formed out of polytetrafluoroethylene or the equivalent, and so that the bodies 52 are formed out of filled phenolic resins or the equivalent as described in the preceding discussion, the electrical charge produced by this charger will vary depending upon the direction in which the rotor 20 is rotated.

When this rotor 20 is rotated clockwise as viewed in FIGS. 2 and 6 of the drawing negative charges are produced on the surface of the rotor 20 by contact with the bodies 52. These negative charges are removed from the surface of this rotor 20 by means of brushes 42 serving as "conductor means" within the broad sense of the term and are conveyed to the switch 58. Simultaneously separation of charges takes place adjacent to the portions of the brushes 42 in contact with the surface of the rotor 20 and in contact with the bodies 48 where these bodies 48 are positioned against the surface of this rotor. As a result of this separation of charges portions of the surface of the rotor 20 moving past the bodies 48 become positively charged. These positive charges are collected by the bodies 52 and conveyed from them through the springs 54 serving as "conductor means" within the broad sense of the term. Some of these charges are conducted by the coatings upon the bodies 52 as previously described. While serving this collecting function the bodies 52 simultaneously cause a separation of charges and produce upon the surface of the rotor 20 negative charges as previously indicated.

With this type of construction as the rotor 20 is rotated clockwise the bodies 48 and 52 cooperate so that the total charge produced by the charger 10 is a summation of the charges produced on the surface of the rotor 20 by the bodies 48 and 52. Thus, when the charger 10 is operated in this manner a relatively high charging rate is achieved. If a slower charging rate is desired the rotor 20 may be rotated in the reverse direction.

When the rotor 20 is turned in this manner the bodies 48 and 52 continue to separate charges on the surface of the rotor 20 as indicated in the preceding description. However, since the abilities of the bodies 48 and 52 to produce friction charges when rubbed against the surface of the rotor 20 differ, the net charge obtained from the friction charger 10 becomes, in effect, the difference between the individual charges produced between the bodies 48 and the rotor 20 and the bodies 52 and the rotor 20. With the materials indicated the polarity of the terminals of the switch 58 is unchanged, when the rotor 20 is turned counterclockwise as viewed in FIGS. 2 and 6 of the drawing, but a smaller charge is produced when the rotor 20 is turned in this manner than is produced when the rotor is turned clockwise.

Preferably the charger 10 is used with a capacitor 60 connected between the terminals 62 of the reversing switch 58 as indicated in FIG. 6 of the drawing. As a result of such use of a capacitor the circuits in which chargers, such as the charger 10, are employed possesses relatively high capacity. Such capacity promotes smoothness of charging rate. Further, the use of a capacitor, such as the capacitor 60, decreases the effect of leakage in a charger, such as the charger 10. Thus, a capacitor such as the capacitor 60, serves to decrease the rate of drop in voltage due to the leakage in a charger on a connected instrument. The use of the reversing switch 58 with this invention permits friction chargers as herein described to be operated so as to slowly and precisely set the voltage applied to an electrical instrument connected to these chargers by reversing the rotation of the rotor in the charger.

It will be realized that friction chargers as herein described are comparatively simple. These chargers can be manufactured at a comparatively nominal cost. They are extremely reliable in operation and are substantially immune from loss of function caused by shock or vibration. Further, friction chargers as herein described can be used so as to produce a uniform charge of a "smooth" category. A very important feature of this invention lies in the fact that these friction chargers can be operated for very prolonged periods as compared to prior related instruments.

A very surprising feature of the present invention lies in the discovery that maximum performance of these chargers does not occur until such time as they have been operated for a substantial period. Thus, friction chargers such as the charger 10 described do not achieve their optimum performance characteristics until such time as the rotor 20 employed in them has been rotated several hundred times.

Those skilled in the art will realize that a variety of changes and modifications may be made in the friction charger 10 illustrated without departing from the essential features or principles of this invention as herein described. As an example of this the external surface of the cylindrical rotor 20 may have the shape of virtually any surface of revolution. Because of these factors this invention is to be considered as being limited only by the appended claims forming a part of this disclosure.

We claim:

1. A friction charger which includes: a rotatably mounted rotor having a surface of a first material, said first material being highly non-conductive; a body of a second material positioned against said surface and contacting only a part of said surface, said second material being different from said first material; a body of a third material positioned against said surface and contacting another part of said surface, said body of said third material being spaced from said body of second material, said third material being different from said first and said second materials, said bodies of said second and third materials being disposed with respect to said rotor so that an area of said rotor first contacts one of said bodies and then the other of said bodies as said rotor is rotated in one direction; and separate conductor means located in contact with each of said bodies so as to convey electrical charges from said surface of said rotor.

2. A friction charger as defined in claim 1 wherein one of said bodies is formed of a highly non-conductive material and wherein said conductor means in contact with said one of said bodies is also in contact with said surface of said rotor at one side of one of said bodies of material.

3. A friction charger as defined in claim 1 wherein one of said bodies is formed of a conductive material and wherein said conductor means in contact with said one of said bodies is spaced from said surface of said rotor.

4. A friction charger as defined in claim 3 wherein the surfaces of said one of said bodies out of contact with the surface of said rotor are coated with an electrically conductive material.

5. A friction charger which includes: a rotatably mounted rotor having a surface of revolution, said surface being formed of a first highly non-conductive material; a body of a second material resiliently biased against a part of said surface, said second material being highly non-conductive and differing from said first material; a conductor in contact with said body of the second material at one side thereof, said conductor resiliently engaging the surface of said rotor at one side of said body of a second material; a body of a third material resiliently biased against another part of said surface, said third material being conductive and being different from said first and said second materials, said bodies of second and third materials being disposed with respect to said rotor so that an area of said rotor first contacts one of said bodies and then the other of said bodies as said rotor is rotated in one direction; and a conductor resiliently engaging said body of a third material so as to convey electrical charges from said surface of said rotor through said body of a third material.

6. A friction charger as defined in claim 5 wherein said second material comprises a mass of halogenated polymer fibers and wherein said third material comprises a thermosetting resin.

7. A friction charger as defined in claim 6 wherein the surfaces of said body of a third material out of contact with said surface of said rotor are coated with an electrically conductive material.

8. A friction charger which includes: a cylindrical housing having ends, the interior of said housing being formed so as to include a plurality of pairs of slots extending between the ends of said housing, said housing being formed of a non-conductive material; a cylindrical rotor positioned within said housing, said rotor having its surface adjacent to said slots and being formed of a non-conductive material; a metal brush positioned within one of said slots within each of said pairs of slots, said brushes contacting the surface of said rotor; a body of a highly non-conductive fibrous material different from the material within said housing and said rotor positioned in contact with each of said brushes and in contact with the surface of said rotor, said bodies being resiliently held against said rotor by said brushes; a body of conductive material located within each of said other slots of each of said other pairs of slots, said bodies of conductive material engaging the surface of said rotor; spring means in electrical contact with said bodies of conductive material, said spring means being positioned within the same slots as said bodies of conductive material, and resiliently biasing said bodies of conductive material against the surface of said rotor.

9. A friction charger which includes: a rotatably mounted rotor having a peripheral surface of a first material, said first material being highly non-conductive; a plurality of bodies of second material positioned against said surface so as to be spaced from one another, said bodies of second material extending axially with respect to said rotor; said second material being different from said first material; a plurality of bodies of a third material positioned against said surface, said bodies of third material extending axially with respect to said rotor, each of said bodies of said third material being located between two of said bodies of a second material and being spaced from said bodies of second material, said third material being different from said first and said second materials; separate conductor means electrically connecting all of said bodies of said second material; other conductor means electrically connecting all of said bodies of said third material.

10. A friction charger as defined in claim 9 wherein said bodies of second material are formed of a highly non-conductive material and wherein said conductor means connecting said bodies of second material are each also in contact with said surface of said rotor at sides of said bodies of second material with respect to said rotor corresponding to a single direction of rotation of said rotor, and wherein said bodies of third material are formed of a non-conductive material and wherein said conductor means in contact with said bodies of said third material are spaced from the surface of said rotor.

11. A friction charger as defined in claim 9 wherein the surfaces of said bodies of third material out of contact with said surface of said rotor are coated with an electrically conductive material.

12. A friction charger as defined in claim 9 including capacitor means, one terminal of said capacitor means being connected to one of said conductor means, and the other terminal of said capacitor means being connected to the other of said conductor means.

13. In a friction charger a cylindrical housing having ends, the interior of said housing being formed so as to include a pair of slots connecting said ends of said housing, said housing being formed of a non-conductive material; a cylindrical rotor positioned within said housing, said rotor having a surface adjacent to said slots formed of a non-conductive material; a metal brush positioned within one of said slots, said brush contacting the surface of said rotor; a body of highly non-conductive fibrous material different from the material within said housing and said rotor surface positioned in contact with said brush and in contact with the surface of said rotor, said body of fibrous material being resiliently held against said rotor by said brush; a body of another material located within the other of said slots so as to engage the surface of said rotor; conductive metal spring means positioned between said housing and said body of another material so as to bias said body of other material against the surface of said rotor and so as to serve as a conductor to convey electrical charges from said body of other material.

14. A friction charger as defined in claim 13 wherein the surfaces of said body of other material remote from said surface of said rotor are coated with an electrically conductive material.

References Cited in the file of this patent

UNITED STATES PATENTS

| | | |
|---|---|---|
| 2,539,371 | Meier | Jan. 23, 1951 |
| 2,798,971 | Bernard | July 9, 1957 |